(12) United States Patent
Kim et al.

(10) Patent No.: US 12,374,714 B2
(45) Date of Patent: Jul. 29, 2025

(54) NON-AQUEOUS ELECTROLYTE SOLUTION AND LITHIUM SECONDARY BATTERY COMPRISING SAME

(71) Applicant: LG Energy Solution, Ltd., Seoul (KR)

(72) Inventors: Gwang Yeon Kim, Daejeon (KR); Jeong Woo Oh, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 761 days.

(21) Appl. No.: 17/623,754

(22) PCT Filed: Sep. 28, 2020

(86) PCT No.: PCT/KR2020/013232
§ 371 (c)(1),
(2) Date: Dec. 29, 2021

(87) PCT Pub. No.: WO2021/066462
PCT Pub. Date: Apr. 8, 2021

(65) Prior Publication Data
US 2022/0263113 A1    Aug. 18, 2022

(30) Foreign Application Priority Data

Oct. 2, 2019  (KR) .................. 10-2019-0122482

(51) Int. Cl.
| | |
|---|---|
| *H01M 10/056* | (2010.01) |
| *H01M 4/36* | (2006.01) |
| *H01M 4/38* | (2006.01) |
| *H01M 4/505* | (2010.01) |
| *H01M 4/525* | (2010.01) |
| *H01M 4/583* | (2010.01) |
| *H01M 10/0525* | (2010.01) |
| *H01M 4/02* | (2006.01) |

(52) U.S. Cl.
CPC ......... *H01M 10/056* (2013.01); *H01M 4/364* (2013.01); *H01M 4/386* (2013.01); *H01M 4/505* (2013.01); *H01M 4/525* (2013.01); *H01M 4/583* (2013.01); *H01M 10/0525* (2013.01); *H01M 2004/027* (2013.01); *H01M 2004/028* (2013.01); *H01M 2300/004* (2013.01)

(58) Field of Classification Search
CPC ........... H01M 10/056; H01M 10/0525; H01M 4/583; H01M 2004/027; H01M 4/386; H01M 4/505; H01M 4/525; H01M 4/364; H01M 2004/028; H01M 2300/004
USPC .......................................................... 429/326
See application file for complete search history.

(56) References Cited

U.S. PATENT DOCUMENTS

| | | | |
|---|---|---|---|
| 6,458,490 B1 | 10/2002 | Hommura et al. | |
| 2005/0084765 A1 | 4/2005 | Lee et al. | |
| 2008/0131785 A1 | 6/2008 | Park et al. | |
| 2009/0047582 A1 | 2/2009 | Kim et al. | |
| 2014/0160631 A1 | 6/2014 | Choi et al. | |
| 2014/0356734 A1 | 12/2014 | Ren et al. | |
| 2015/0104717 A1 | 4/2015 | Kim et al. | |
| 2016/0293944 A1 | 10/2016 | Yoon et al. | |
| 2018/0269528 A1* | 9/2018 | Zhang | H01M 4/131 |
| 2018/0342767 A1* | 11/2018 | Ahn | H01M 4/525 |
| 2019/0058216 A1 | 2/2019 | Oh et al. | |
| 2019/0198925 A1 | 6/2019 | Lee et al. | |
| 2019/0379087 A1 | 12/2019 | Oh et al. | |
| 2020/0020982 A1* | 1/2020 | Yamazaki | H01M 10/052 |
| 2022/0006081 A1* | 1/2022 | Choi | C01G 53/00 |

FOREIGN PATENT DOCUMENTS

| | | | | |
|---|---|---|---|---|
| CN | 1612405 A | 5/2005 | | |
| CN | 101371398 A | 2/2009 | | |
| CN | 106159329 | * 11/2016 | .......... | H01M 10/052 |
| CN | 108717977 A | 10/2018 | | |
| CN | 109417196 A | 3/2019 | | |
| CN | 110178258 A | 8/2019 | | |
| EP | 1508934 A1 | 2/2005 | | |
| KR | 20050020067 A | 3/2005 | | |
| KR | 100810634 B1 | 3/2008 | | |
| KR | 20140090277 A | 7/2014 | | |
| KR | 20150030853 A | 3/2015 | | |
| KR | 20150040736 A | 4/2015 | | |
| KR | 20150095248 A | 8/2015 | | |
| KR | 20180065755 A | 6/2018 | | |
| KR | 20180065958 A | 6/2018 | | |
| KR | 20180083272 A | 7/2018 | | |

(Continued)

OTHER PUBLICATIONS

English language machine translation of "Lithium titanate battery electrolyte and lithium titanate battery" by Tian Xiuli et al. in CN106159329 (Year: 2016).*
International Search Report for PCT/KR2020/013232 dated Jan. 15, 2021. 2 pgs.
Extended European Search Report including Written Opinion for Application No. 20872514.3 dated Aug. 11, 2022, pp. 1-9.

*Primary Examiner* — Niki Bakhtiari
*Assistant Examiner* — Omar M Kekia
(74) *Attorney, Agent, or Firm* — Lerner David LLP

(57) ABSTRACT

A non-aqueous electrolyte solution and a lithium secondary battery including the same are disclosed herein. In some embodiments, a non-aqueous electrolyte solution includes an organic solvent containing cyclic carbonate, dimethyl carbonate, and a nitrile-based solvent represented by Formula 1, and a lithium salt:

R—CN  [Formula 1]

wherein, in Formula 1, R is an alkyl group having 3 to 10 carbon atoms or an alkenyl group having 3 to 10 carbon atoms.

11 Claims, No Drawings

(56) References Cited

FOREIGN PATENT DOCUMENTS

| KR | 20190033004 A | 3/2019 |
|----|---------------|--------|
| KR | 20190050709 A | 5/2019 |
| WO | 2007081169 A1 | 7/2007 |

\* cited by examiner

NON-AQUEOUS ELECTROLYTE SOLUTION AND LITHIUM SECONDARY BATTERY COMPRISING SAME

CROSS-REFERENCE TO RELATED APPLICATIONS

This application is a national phase entry under 35 U.S.C. § 371 of International Application No. PCT/KR2020/013232, filed on Sep. 28, 2020, which claims priority from Korean Patent Application No. 10-2019-0122482, filed on Oct. 2, 2019, the disclosures of which are incorporated by reference herein.

TECHNICAL FIELD

The present invention relates to a non-aqueous electrolyte solution and a lithium secondary battery including the same, and more particularly, to a non-aqueous electrolyte solution capable of improving the fast charge performance and resistance properties of a lithium secondary battery, and a lithium secondary battery including the same.

BACKGROUND ART

A lithium secondary battery is generally manufactured by interposing a separator between a positive electrode including a positive electrode active material made of a lithium-containing transition metal oxide and a negative electrode including a negative electrode active material capable of storing lithium ions, thereby providing an electrode assembly, inserting the electrode assembly into a battery case, injecting a non-aqueous electrolyte solution which is a medium for transferring lithium ions thereto, and then sealing the battery case.

Such a lithium secondary battery is used in portable electronic devices such as mobile phones and laptops, as well as in electric vehicles, and the demand for the lithium secondary battery is rapidly increasing. As the demand for lithium secondary batteries is increasing and the application thereof is diversified, the level of performance required for lithium secondary batteries is also gradually increasing. For example, a lithium secondary battery used in an electric vehicle requires high energy density and high output properties, and durability to be used for a long period of time under harsh conditions. In addition, in recent year, the demand for fast charge performance which allows a battery to be charged in a short time is also increasing.

However, lithium secondary batteries developed to date do not have sufficient fast charge performance, and even when fast charge is available, the battery performance rapidly degrades when fast charging is repeated.

DISCLOSURE OF THE INVENTION

Technical Problem

An aspect of the present invention provides a non-aqueous electrolyte solution capable of improving the fast charge performance and low-temperature output properties of a lithium secondary battery, and a lithium secondary battery including the same.

Technical Solution

According to an aspect of the present invention, provided is a non-aqueous electrolyte solution including an organic solvent and a lithium salt, wherein the organic solvent contains cyclic carbonate, dimethyl carbonate, and a nitrile-based solvent represented by Formula 1 below.

$$R-CN \quad \text{[Formula 1]}$$

In Formula 1 above, R is an alkyl group having 3 to 10 carbon atoms or an alkenyl group having 3 to 10 carbon atoms According to another aspect of the present invention, provided is a lithium secondary battery including a positive electrode having a positive electrode active material, a negative electrode having a negative electrode active material, a separator interposed between the negative electrode and the positive electrode, and the non-aqueous electrolyte solution according to the present invention.

Advantageous Effects

As in the present invention, when a non-aqueous electrolyte solution including a solvent of a specific combination, that is, an organic solvent containing cyclic carbonate, dimethyl carbonate, and a nitrile-based solvent of Formula 1, and a lithium salt is used, a lithium secondary battery having excellent fast charge performance and low-temperature output properties may be implemented.

BEST MODE FOR CARRYING OUT THE INVENTION

Hereinafter, the present invention will be described in more detail.

The present inventors have repeatedly conducted research to develop a lithium secondary battery with excellent fast charge performance. As a result, the inventors have discovered that when a cyclic carbonate-based solvent, dimethyl carbonate, and a nitrile-based solvent represented by Formula I are used together as an organic solvent for a non-aqueous electrolyte solution, it is possible to improve the low-temperature output properties and fast charge performance of a lithium secondary battery, and have completed the present invention.

Non-Aqueous Electrolyte Solution

A non-aqueous electrolyte solution according to the present invention includes (1) an organic solvent containing cyclic carbonate, dimethyl carbonate, and a nitrile-based solvent represented by [Formula 1] below, and (2) a lithium salt. In addition, the non-aqueous electrolyte solution of the present invention, may further include, if necessary, (3) a surfactant and/or (4) an additive.

Hereinafter, each component of the non-aqueous electrolyte solution of the present invention will be described.

(1) Organic Solvent

The non-aqueous electrolyte solution of the present invention includes a cyclic carbonate-based solvent, dimethyl carbonate, and a nitrile-based solvent as an organic solvent.

The cyclic carbonate is an organic solvent of high viscosity, and is an organic solvent having a high dielectric constant, thereby dissociating a lithium salt in an electrolyte solution well, and may be, for example, at least one selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate. Among the above, ethylene carbonate capable of maintaining stable SEI film passivation ability is particularly preferred.

The cyclic carbonate may be included in 5 to 15 vol % based on the total volume of the organic solvent. When the cyclic carbonate is included in less than 5 vol %, an SEI film is unstable, so that the passivation ability cannot be stably maintained. When included in greater than 15 vol %, the effect of improving fast charge performance and low-temperature output is insignificant.

Next, the dimethyl carbonate and the nitrile-based solvent are components to improve low-temperature output properties and fast charging performance. The dimethyl carbonate and the nitrile-based solvent have relatively low viscosity and a high dielectric constant, and thus, when applied, an effect of improving the ion conductivity and lithium ion mobility of the electrolyte solution may be obtained. Specifically, the dimethyl carbonate may be included in 40 to 90 vol %, preferably 50 to 80 vol % based on the total volume of the organic solvent. When the dimethyl carbonate is included in less than 40 vol %, the ion conductivity and lithium mobility of the electrolyte solution are degraded, making it difficult to obtain an effect of improving low-temperature output properties and fast charging performance. When included in greater than 90 vol %, side reactions are caused due to the reduction decomposition of the dimethyl carbonate.

Next, the nitrile-based solvent is a component to improve fast charge performance, and is a compound represented by Formula 1 below.

$$R-CN \quad \text{[Formula 1]}$$

In Formula 1 above, R is an alkyl group having 3 to 10 carbon atoms or an alkenyl group having 3 to 10 carbon atoms, preferably an alkyl group having 3 to 6 carbon atoms or an alkenyl group having 3 to 6 carbon atoms, more preferably an alkyl group having 3 to 5 carbon atoms or an alkenyl group having 3 to 5 carbon atoms.

For example, the nitrile-based solvent represented by Formula 1 above may be one or more s elected from the group consisting of propionitrile, n-butyronitrile, iso-butyronitrile, n-pentenenitrile, 2-methyl-2-butenenitrile, and 3-methyl-2-butenenitrile.

The nitrile-based solvent represented by Formula 1 above is included in 5 to 40 vol %, preferably 5 to 35 vol % based on the total volume of the organic solvent. When the nitrile-based solvent is included in less than 5 vol %, an effect of improving low-temperature output properties and fast charging performance is insignificant. When included in greater than 40 vol %, side reactions occur due to the decomposition of the nitrile-based solvent.

Meanwhile, in the non-aqueous organic solvent, it is preferable that the ratio of the volume of the cyclic carbonate:the sum of the volume of the dimethyl carbonate and the volume of the nitrile-based solvent is 1:8 to 1:10. That is, it is preferable that the ratio of the volume of the dimethyl carbonate and the nitrile-based solvent combined to the volume of the cyclic carbonate is 8 to 10. When the above range is satisfied, the fast charge performance and low-temperature output properties may be improved without degrading the high-temperature lifespan properties and high-temperature storage properties.

(2) Lithium Salt

As a lithium salt used in the present invention, various lithium salts commonly used in an electrolyte solution for a lithium secondary battery may be used without limitation. For example, the lithium salt may include $Li^+$ as a cation, and as an anion, may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$, and $(CF_3CF_2SO_2)_2N^-$.

Specifically, the lithium salt may be at least one selected from the group consisting of LiCl, LiBr, LiI, $LiBF_4$, $LiClO_4$, $LiAlO_4$, $LiAlCl_4$, $LiPF_6$, $LiSbF_6$, $LiAsF_6$, $LiB_{10}Cl_{10}$, LiBOB ($LiB(C_2O_4)_2$), $LiCF_3SO_3$, LiTFSI ($LiN(SO_2CF_3)_2$), LiFSI ($LiN(SO_2F)_2$), $LiCH_3SO_3$, $LiCF_3CO_2$, $LiCH_3CO_2$, and LiBETI ($LiN(SO_2CF_2CF_3)_2$. Specifically, the lithium salt may include a single material or a mixture of two or more selected from the group consisting of $LiBF_4$, $LiClO_4$, $LiPF_6$, LiBOB ($LiB(C_2O_4)_2$), $LiCF_3SO_3$, LiTFSI ($LiN(SO_2CF_3)_2$), LiFSI ($LiN(SO_2F)_2$), and LiBETI ($LiN(SO_2CF_2CF_3)_2$.

The lithium salt may be included in a concentration of 0.8 M to 4 M, specifically 1.5 M to 3 M in the electrolyte solution. When the concentration of the lithium salt satisfies the above range, the yield of lithium ions ($Li^+$ transference number) and the dissociation of lithium ions are improved, so that the output properties of a battery may be improved.

(3) Surfactant

The non-aqueous electrolyte solution according to the present invention may further include, if necessary, a surfactant. When a surfactant is included, the surface resistance between an electrolyte solution and an electrode interface is reduced, so that an effect of improving wetting may be obtained.

In the present invention, the surfactant may include, for example, a compound represented by Formula II below.

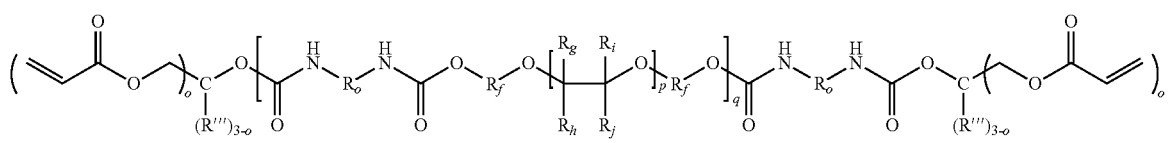

[Formula II]

In Formula II above, $R_f$ is a at least one fluorine-substituted or unsubstituted alkylene group having 1 to 5 carbon atoms, preferably a flourine-substituted alkylene group having 1 to 5 carbon atoms.

$R_g$, $R_h$, $R_i$ and $R_j$ are each independently a fluorine element, or a fluorine-substituted or unsubstituted alkyl group having 1 to 3 carbon atoms, preferably a fluorine element or a fluorine-substituted alkyl group having 1 to 3 carbon atoms.

$R_0$ is an aliphatic hydrocarbon group or an aromatic hydrocarbon group. Specifically, the aliphatic hydrocarbon group may include, for example, at least one selected from the group consisting of (a) at least one alicyclic hydrocarbon group selected from the group consisting of a substituted or unsubstituted cycloalkylene group having 4 to 20 carbon atoms, a substituted or unsubstituted cycloalkenylene group having 4 to 20 carbon atoms, and a substituted or unsubstituted heterocycloalkylene group having 2 to 20 carbon atoms, and (b) at least one linear hydrocarbon group selected from the group consisting of a substituted or unsubstituted alkylene group having 1 to 20 carbon atoms, a substituted or unsubstituted alkoxylene group having 1 to 20 carbon atoms, a substituted or unsubstituted alkenylene group having 2 to 20 carbon atoms, and a substituted or unsubstituted alkynylene group having 2 to 20 carbon atoms. In addition, the aromatic hydrocarbon group may include at least one selected from the group consisting of a substituted or unsubstituted arylene group having 6 to 20 carbon atoms and a substituted or unsubstituted heteroarylene group having 2 to 20 carbon atoms.

R''' is hydrogen, or an alkyl group having 1 to 3 carbon atoms.

Meanwhile, o is an integer of any one of 1 to 3 and p and q are the numbers of repeating units, wherein p is an integer of any one of 1 to 10, and q is an integer of any one of 1 to 15.

The oligomer represented by Formula II above includes an acrylate-based functional group which is hydrophilic at both ends as well as a fluorine-substituted ethylene group which is hydrophobic, and thus, may function as a surfactant to lower the surface resistance between the electrolyte solution and an electrode interface and improve electrode wetting.

Preferably, the surfactant may be an oligomer represented by Formula II-1 below.

based on the total weight of the non-aqueous electrolyte solution. When the content of the surfactant satisfies the above range, an effect of improving electrode wetting may be obtained. When the content of the surfactant is too low, the effect of improving wetting is insignificant, and when too high, the surfactant acts as an impurity to increase resistance and lower ion conductivity.

(4) Additive

Although not necessary, the electrolyte solution according to the present invention may further include additives to prevent cathode disintegration due to the decomposition of the electrolyte solution in a high-output environment, or to further improve the low-temperature high-rate discharge properties, high-temperature stability, overcharge prevention, battery expansion suppression effect at high temperatures, and the like.

Examples of the additive may be at least one selected from the group consisting of a cyclic carbonate-based compound, a halogen-substituted carbonate compound, a sultone-based compound, a sulfate-based compound, a phosphate-based compound, a borate-based compound, a nitrile-based compound, a benzene-based compound, an amine-based compound, a silane-based compound, and a lithium salt-based compound.

The cyclic carbonate-based compound may be, for example, vinylene carbonate (VC) or vinylethylene carbonate, and the like.

[Formula II-1]

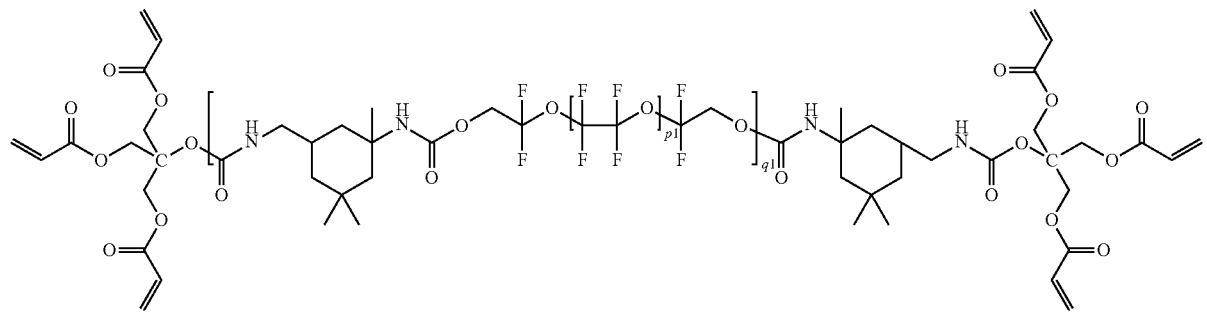

In Formula II-1 above, p1 and q1 are the numbers of repeating units, p1 is an integer of any one of 1 to 10, and q1 is an integer of any one of 1 to 15.

Meanwhile, the weight average molecular weight (MW) of the oligomer represented by Formula II above may be controlled by the number of repeating units, and may be about 1,000 g/mol to 100,000 g/mol, specifically 1,000 g/mol to 50,000 g/mol, and more specifically 1,000 g/mol to 10,000 g/mol. When the weight average molecular weight of the oligomer satisfies the above range, the oligomer has high affinity with the electrolyte solution, and thus, may be dissolved in the electrolyte solution well. The weight average molecular weight may refer to a conversion value for a standard polystyrene measured by Gel Permeation Chromatography (GPC), and unless otherwise specified, molecular weight may refer to the weight average molecular weight. For example, in the present invention, the weight average molecular weight is measured using Agilent's 1200 series under GPC conditions, and a column used at this time may be Agilent's PL mixed B column and a solvent may be THF.

The surfactant may be included in 0.01 to 5 wt %, preferably 0.1 to 3 wt %, and more preferably 0.1 to 1 wt %

The halogen-substituted carbonate compound may be, for example, fluoroethylene carbonate (FEC), and the like.

The sultone-based compound may be, for example, at least one compound selected from the group consisting of 1,3-propane sultone (PS), 1,4-butane sultone, ethene sultone, 1,3-propene sultone (PRS), 1,4-butene sultone, and 1-methyl-1,3-propene sultone.

The sulfate-based compound may be, for example, ethylene sulfate (Esa), trimethylene sulfate (TMS), methyl trimethylene sulfate (MTMS), or the like.

The phosphate-based compound may be, for example, one or more compounds selected from the group consisting of lithium difluoro(bisoxalato)phosphate, lithium difluorophosphate, tetramethyl trimethyl silyl phosphate, trimethyl silyl phosphite, tris(2,2,2-trifluoroethyl)phosphate, and tris(trifluoroethyl)phosphite.

The borate-based compound may be, for example, tetraphenylborate, lithium oxalyldifluoroborate, and the like.

The nitrile-based compound may be, for example, at least one compound selected from the group consisting of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The benzene-based compound may be, for example, fluorobenzene, and the like, and the amine-based compound may be triethanolamine or ethylenediamine, and the like. The silane-based compound may be tetravinylsilane and the like.

The lithium salt-based compound is a compound different from the lithium salt included in the non-aqueous electrolyte solution, and may be one or more compounds selected from the group consisting of $LiPO_2F_2$, lithium difluoro(oxalato)borate (LiODFB), lithium bisoxalatoborate (LiBOB, (LiB$(C_2O_4)_2$), and $LiBF_4$.

Meanwhile, the additives may be used alone, or two or more thereof may be mixed and used.

Preferably, the non-aqueous electrolyte solution of the present invention may include, as an additive, one or more selected from the group consisting of a cyclic carbonate-based compound, a sultone-based compound, a sulfate-based compound, a lithium salt-based compound, and a benzene-based compound, and more preferably, may include a cyclic carbonate-based compound, a sultone-based compound, a sulfate-based compound, a lithium salt-based compound, and a benzene-based compound. Even more preferably, the non-aqueous electrolyte solution of the present invention may include vinylene carbonate, 1,3-propane sultone, ethylene sulfate, $LiBF_4$, and fluorobenzene.

When a combination of the additives is included, a film may be stably formed simultaneously on a positive electrode and a negative electrode. At this time, by the film formed on the negative electrode, the electrolyte is suppressed from being decomposed under high-temperature and high pressure conditions, and by the film formed on the positive electrode, a transition metal included in the positive electrode is suppressed from being eluted, so that the high-temperature and high-pressure properties and stability of the battery may be improved.

Meanwhile, the total amount of the additive may be, based on the total weight of the electrolyte solution, 1 to 15 wt %, preferably 1 to 12 wt %, and more preferably 1 to 11 wt %. When the additive is included in the above range, a film may be stably formed on an electrode and ignition may be suppressed during overcharge, while a side reaction may be prevented from occurring during an initial activation process of a secondary battery, or the additive may be prevented from remaining or precipitated.

Lithium Secondary Battery

Next, a lithium secondary battery according to the present invention will be described.

The lithium secondary battery according to the present invention includes a positive electrode, a negative electrode, a separator interposed between the positive electrode and the negative electrode, and a non-aqueous electrolyte solution. At this time, the non-aqueous electrolyte solution is the non-aqueous electrolyte solution according to the present invention. The non-aqueous electrolyte solution has been described above, and thus, the description thereof will be omitted. Hereinafter, other components will be described.

(1) Positive Electrode

A positive electrode according to the present invention may include a positive electrode active material layer containing a positive electrode active material, and if necessary, the positive electrode active material layer may further include a conductive material and/or a binder.

The positive electrode active material is a compound capable of reversible intercalation and de-intercalation of lithium, and may specifically be a lithium composite metal oxide containing one or more transition metals such as cobalt, manganese, nickel, or aluminum, and lithium. More specifically, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (0<Y<1), $LiMn_{2-z}Ni_zO_4$ (0<Z<2), etc.), a lithium-nickel-cobalt-based oxide (e.g., $LiNi_{1-Y1}Co_{Y1}O_2$ (0<Y1<1), etc.), a lithium-manganese-cobalt-based oxide (e.g., $LiCo_{1-Y2}Mn_{Y2}O_2$ (0<Y2<1), $LiMn_{2-z1}Co_{z1}O_4$ (0<Z1<2), a lithium-nickel-manganese-cobalt-based oxide (e.g., $Li(Ni_pCo_qMn_{r1})O_2$ (0<p<1, 0<q<1, 0<r1<1, and p+q+r1=1) or $Li(Ni_{p1}Co_{q1}Mn_{r2})O_4$ (0<p1<2, 0<q1<2, 0<r2<2, and p1+q1+r2=2), or a lithium-nickel-cobalt-transition metal (M) oxide (e.g., $Li(Ni_{p2}Co_{q2}Mn_{r3}M_{s2})O_2$ (wherein M is selected from the group consisting of Al, Fe, V, Cr, Ti, Ta, Mg, and Mo, and p2, q2, r3, and s2 are each an atomic fraction of stand-alone elements, wherein 0<p2<1, 0<q2<1, 0<r3<1, 0<s2<1, and p2+q2+r3+s2=1) and the like, and any one thereof or two or more compounds thereof may be included.

Specifically, the lithium composite transition metal oxide may be a lithium composite transition metal oxide having a nickel content of 70 atm % or greater, and more specifically, may be a lithium-nickel-cobalt-manganese-based oxide represented by Formula A below.

$$Li_x[Ni_yCo_zMn_wM^1_v]O_{2-p}A_p$$ [Formula A]

In Formula A above, the $M^1$ is a doping element substituted for a transition metal site, and may be one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo.

The A is an element substituted for an oxygen site, and may be one or more elements selected from the group consisting of F, Cl, Br, I, At, and S.

The x represents the atomic ratio of lithium in the lithium-nickel-cobalt-manganese-based oxide with respect to the total transition metals, and may be 0.8 to 1.2, preferably 1 to 1.2.

The y represents the atomic ratio of nickel among the transition metals in the lithium-nickel-cobalt-manganese-based oxide, and may be 0.7 to less than 1, preferably 0.75 to less than 1, and more preferably 0.75 to 0.98. As the content of nickel among the transition metals increases, a higher capacity may be implemented, so that it is more advantageous in implementing a high capacity when the nickel content is 0.7 or greater.

The z represents the atomic ratio of cobalt among the transition metals in the lithium-nickel-cobalt-manganese-based oxide, and may be greater than 0 to less than 0.3, preferably 0.01 to less than 0.3, and more preferably 0.01 to less than 0.25.

The w represents the atomic ratio of manganese among the transition metals in the lithium-nickel-cobalt-manganese-based oxide, and may be greater than 0 to less than 0.3, preferably 0.01 to less than 0.3, and more preferably 0.01 to less than 0.25.

The v represents the atomic ratio of the doping element $M^1$ doped on the transition metal site in the lithium-nickel-cobalt-manganese-based oxide, and may be 0 to 0.2, preferably 0 to 0.1. When the doping element $M^1$ is added, there is an effect of improving the structural stability of the lithium-nickel-cobalt-manganese-based oxide. However, when the content of doping elements increases, the capacity may decrease, so that it is preferable that the doping element $M^1$ is included in the content of 0.2 or less.

The p represents the atomic ratio of the element A substituted for the oxygen site, and may be 0 to 0.2, preferably 0 to 0.1.

Meanwhile, in Formula A above, it may be that y+z+w+v=1.

Specific examples of the lithium-nickel-cobalt-manganese-based oxide may be $LiNi_{0.8}Co_{0.1}Mn_{0.1}O_2$ and the like, but are not limited thereto.

The positive electrode active material may be included in an amount of 80 wt % to 98 wt %, more specifically 85 wt % to 98 wt % based on the total weight of the positive electrode active material layer. When the positive electrode active material is included in the above range, excellent capacity properties may be exhibited.

Next, the conductive material is used to impart conductivity to an electrode, and any conductive material may be used without particular limitation as long as it has electron conductivity without causing a chemical change in a battery to be constituted.

Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as a titanium oxide; or a conductive polymer such as a polyphenylene derivative, and any one thereof or a mixture of two or more thereof may be used.

The conductive material may be included in an amount of 0.1 wt % to 10 wt %, preferably 0.1 wt % to 5 wt % based on the total weight of the positive electrode active material layer.

Next, the binder serves to improve the bonding between positive electrode active material particles and the adhesion between a positive electrode active material and a current collector.

Specific examples of the binder may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene butadiene rubber (SBR), fluorine rubber, or various copolymers thereof, and any one thereof or a mixture of two or more thereof may be used. The binder may be included in an amount of 0.1 wt % to 15 wt %, preferably 0.1 wt % to 10 wt % based on the total weight of the positive electrode active material layer.

The positive electrode of the present invention as described above may be manufactured by a method for manufacturing a positive electrode known in the art. For example, the positive electrode may be manufactured by preparing a positive electrode slurry by dissolving or dispersing a positive electrode material, a binder and/or a conductive material in a solvent and applying the positive electrode slurry on a positive electrode current collector, followed by drying and roll-pressing, or by casting the positive electrode slurry on a separate support, and then laminating a film obtained by peeling off the support on a positive electrode current collector.

The positive electrode current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the positive electrode current collector to improve the adhesion force of a positive electrode material. For example, the positive electrode current collector may be used in various forms such as a film, a sheet, a foil, a net, a porous body, a foam, and a non-woven body.

The solvent may be a solvent commonly used in the art, and may be dimethyl sulfoxide (DMSO), isopropyl alcohol, N-methylpyrrolidone (NMP), acetone, water, or the like. Any one thereof or a mixture of two or more thereof may be used. The amount of the solvent to be used is not particularly limited as long as it may be adjusted such that a positive electrode mixture material has an appropriate viscosity in consideration of the applying thickness, preparation yield, workability, and the like of the positive electrode mixture material.

(2) Negative Electrode

Next, a negative electrode will be described.

The negative electrode according to the present invention includes a negative electrode active material layer containing a negative electrode active material, and the negative electrode active material layer may further include, if necessary, a conductive material and/or a binder.

As the negative electrode active material, various negative electrode active materials used in the art, for example, a carbon-based negative electrode active material, a silicon-based negative electrode active material, a metal alloy, and the like, may be used.

According to one embodiment, the negative electrode active material may include a carbon-based negative electrode active material, and as the negative electrode active material, various carbon-based negative electrode active materials used in the art, for example, graphite-based materials such as natural graphite, artificial graphite, and Kish graphite; high-temperature sintered carbon such as pyrolytic carbon, mesophase pitch based carbon fiber, meso-carbon microbeads, Mesophase pitches, and petroleum or coal tar pitch derived cokes, soft carbon, hard carbon, and the like, may be used. The shape of the carbon-based negative electrode active material is not particularly limited. Materials of various shapes such as irregular, planar, flaky, spherical, or fibrous shapes may be used.

Preferably, the carbon-based negative electrode active material may include at least one or more of natural graphite and artificial graphite. More preferably, the carbon-based negative electrode active material may include natural graphite and artificial graphite. When natural graphite and artificial graphite are used together, the adhesion to a current collector is increased to prevent the detachment of an active material.

According to another embodiment, the negative electrode active material may include a carbon-based negative electrode active material and a silicon-based negative electrode active material.

Specific examples of the carbon-based negative electrode active material are the same as described above.

The silicon-based negative electrode active material may include one or more selected from the group consisting of Si, $SiO_x$ (wherein 0<x<2), a silicon carbide (SiC), and an Si—Y alloy (wherein, the Y is an element selected from the group consisting of an alkali metal, an alkaline earth metal, a Group 13 element, a Group 14 element, a transition metal, a rare earth element, and a combination thereof, but not Si). The element Y may be selected from the group consisting of Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Since the silicon-based negative electrode active material exhibits higher capacity properties than the carbon-based negative electrode active material, when the silicon-based negative electrode active material is additionally included, more excellent capacity properties may be obtained.

The mixing ratio of the silicon-based negative electrode active material to the carbon-based negative electrode active material may be a weight ratio of 1:99 to 50:50, preferably 5:95 to 30:70. When the mixing ratio of the silicon-based negative electrode active material to the carbon-based negative electrode active material satisfies the above range, the volume expansion of the silicon-based negative electrode active material is suppressed while the capacity properties are improved, so that it is possible to ensure excellent cycle performance.

The negative electrode active material may be included in an amount of 80 wt % to 99 wt % based on the total weight of the negative electrode active material layer. When the content of the negative electrode active material satisfies the above range, excellent capacity properties and electrochemical properties may be obtained.

Next, the conductive material is a component for further improving the conductivity of the negative electrode active material, and may be added in an amount of 10 wt % or less, specifically 5 wt % or less, based on the total weight of the negative electrode active material layer. The conductive material is not particularly limited as long as it has conductivity without causing a chemical change in the battery. For example, graphite such as natural graphite or artificial graphite; carbon black such as acetylene black, Ketjen black, channel black, furnace black, lamp black, and thermal black; conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like may be used.

The binder is a component for assisting in bonding between a conductive material, an active material, and a current collector, and is typically added in an amount of 0.1 wt % to 10 wt % based on the total weight of a negative electrode active material layer. Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber, nitrile-butadiene rubber, fluorine rubber, various copolymers thereof, and the like.

The negative electrode may be manufactured by a method for manufacturing a negative electrode known in the art. For example, the negative electrode may be manufactured by preparing a negative electrode slurry by dissolving or dispersing a negative electrode active material and selectively a binder and a conductive material in a solvent and applying, roll-pressing, and then drying the negative electrode slurry, or by casting the negative electrode slurry on a separate support, and then laminating a film obtained by peeling off the support on a negative electrode current collector.

The negative electrode current collector is not particularly limited as long as it has a high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode current collector may typically have a thickness of 3 μm to 500 μm, and as in the case of the positive electrode current collector, microscopic irregularities may be formed on the surface of the negative electrode current collector to improve the adhesion of a negative electrode active material. For example, the negative electrode current collector may be used in various forms such as a film, a sheet, a foil, a net, a porous body, a foam, and a non-woven body.

The solvent may be a solvent commonly used in the art, and may be dimethyl sulfoxide (DMSO), isopropyl alcohol, N-methylpyrrolidone (NMP), acetone, water, or the like. Any one thereof or a mixture of two or more thereof may be used. The amount of the solvent to be used is not particularly limited as long as it may be adjusted such that a negative electrode slurry has an appropriate viscosity in consideration of the applying thickness, preparation yield, workability, and the like of a negative electrode mixture material.

(3) Separator

The lithium secondary battery according to the present invention includes a separator between the positive electrode and the negative electrode.

The separator is to separate the negative electrode and the positive electrode and to provide a movement path for lithium ions. Any separator may be used without particular limitation as long as it is a separator commonly used in a secondary battery. Particularly, a separator having excellent moisture-retention of an electrolyte solution as well as low resistance to ion movement in the electrolyte solution is preferable.

Specifically, as the separator, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used. Also, a coated separator including a ceramic component or a polymer material may be used to secure heat resistance or mechanical strength, and may be selectively used in a single-layered or a multi-layered structure.

The lithium secondary battery according to the present invention as described above may be usefully used in portable devices such as a mobile phone, a notebook computer, and a digital camera, and in electric cars such as a hybrid electric vehicle (HEV).

Accordingly, according to another embodiment of the present invention, a battery module including the lithium secondary battery as a unit cell, and a battery pack including the same are provided.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), or a power storage system.

The external shape of the lithium secondary battery of the present invention is not particularly limited, but may be a cylindrical shape using a can, a square shape, a pouch shape, a coin shape, or the like.

The lithium secondary battery according to the present invention may be used in a battery cell which is used as a power source for a small-sized device, and may also be preferably used as a unit cell for a medium- and large-sized battery module including a plurality of battery cells.

MODE FOR CARRYING OUT THE INVENTION

Hereinafter, the present invention will be described in detail with reference to specific examples.

Example 1

(Preparing Non-Aqueous Electrolyte Solution)

In a non-aqueous organic solvent in which ethylene carbonate (EC):dimethyl carbonate (DMC):propionitrile (PN) are mixed in a volume ratio of 10:80:10, $LiPF_6$ was dissolved to 0.5 M and LiFSI was dissolved to 1.0 M. Then, as an additive, 3 wt % of vinylene carbonate, 0.5 wt % of 1,3-propane sultone, 1 wt % of ethylene sulfate, 0.2 wt % of $LiBF_4$, and 6 wt % of fluorobenzene were added thereto to prepare a non-aqueous electrolyte solution.

(Preparing Positive Electrode)

A lithium-nickel-manganese-cobalt-based oxide ($LiNi_{0.8}Co_{0.1}Mn_{0.1}O_2$; NCM811) as positive electrode active material particles, carbon black as a conductive material, and polyvinylidene fluoride (PVDF) as a binder were added to N-methyl-2-pyrrolidone (NMP), which is a solvent, in a weight ratio of 97.7:0.3:2 to prepare a positive electrode active material slurry. The positive electrode active material slurry was applied to a positive electrode current collector (Al thin film) having a thickness of 20 μm, dried, and then roll pressed to prepare a positive electrode.

(Preparing Negative Electrode)

A negative electrode active material (artificial graphite: SiO=95:5 weight ratio), PVDF as a binder, and carbon black as a conductive material were added to NMP, which is a solvent, in a weight ratio of 97:0.5:2.5 to prepare a negative electrode active material slurry. The negative electrode active material slurry was applied to a negative electrode current collector (Cu thin film) having a thickness of 10 μm, dried, and then roll pressed to prepare a negative electrode.

(Manufacturing Secondary Battery)

The positive electrode and the negative electrode prepared as described above were sequentially stacked with a porous polyethylene film to manufacture an electrode assembly according to a typical method. Then, the electrode assembly was received in a pouch-type secondary battery case, and the non-aqueous electrolyte solution prepared above was injected thereto to manufacture a lithium secondary battery.

Example 2

A lithium secondary battery was manufactured in the same manner as in Example 1 except that a non-aqueous electrolyte solution in which ethylene carbonate (EC):dimethyl carbonate (DMC):propionitrile (PN) are mixed in a volume ratio of 10:60:30 was used.

Comparative Example 1

A lithium secondary battery was manufactured in the same manner as in Example 1 except that a non-aqueous electrolyte solution in which ethylene carbonate:dimethyl carbonate (DMC) are mixed in a volume ratio of 10:90 was used.

Experimental Example 1 Evaluation of Low-Temperature Output Performance

Each of the lithium secondary batteries manufactured in Examples 1 and 2 and Comparative Example 1 was subjected to a formation process for 3 hours at 25° C. at a rate of 0.1 C, and then subjected to initial charge/discharge to 4.2 V at 25° C. with 0.33 C rate/2.5 V voltage.

Thereafter, the direct current internal resistance (DCIR) of the secondary battery at room temperature was measured by using a voltage difference generated by discharging for 10 seconds, 30 seconds, and 60 seconds, respectively, at a temperature of 25° C. and a rate of 2.5 C in a SOC 50% state.

In addition, the direct current internal resistance (DCIR) of the secondary battery at 0° C. was measured by using a voltage difference generated by discharging for 60 seconds at a temperature of 0° C. and a rate of 2.5 C in a SOC 50% state.

In addition, the direct current internal resistance (DCIR) of the secondary battery at −10° C. was measured by using a voltage difference generated by discharging for 30 seconds at a temperature of −10° C. and a rate of 2.5 C in a SOC 50% state. The measurement results are shown in [Table 1] below.

TABLE 1

| Temperature | 25° C. | | | 0° C. | −10° C. |
|---|---|---|---|---|---|
| Discharge time | 10 s | 30 s | 60 s | 60 s | 30 s |
| Example 1 | 63.3 | 79.3 | 93.2 | 223.6 | 199.9 |
| Example 2 | 56.1 | 71.3 | 84.7 | 198.1 | 177.8 |
| Comparative Example 1 | 68.2 | 84.7 | 99.1 | 249.1 | 207.6 |

From Table 1 above, it can be confirmed the secondary batteries of Examples 1 and 2 in which the non-aqueous electrolyte solution of the present invention was used have lower resistance properties at room temperature and low temperatures than the secondary battery of Comparative Example 1.

Experimental Example 2: Ion Conductivity

The ion conductivity was measured at 25° C. using METTLER TOLEDO Co., Ltd's Seven Excellence S700. Specifically, the non-aqueous electrolyte solution prepared in each of Examples 1 to 2 and Comparative Example 1 was filled in a bath such that a probe for measuring ion conductivity was immersed, and then the ion conductivity was measured using the impregnated probe. The measured ion conductivity values are shown in Table 2 below

TABLE 2

| | Ion conductivity (mS/cm) |
|---|---|
| Example 1 | 12.21 |
| Example 2 | 15.08 |
| Comparative Example 1 | 10.50 |

As shown in Table 2 above, the electrolyte solution of each of Examples 1 and 2 exhibited excellent ion conductivity compared to the non-aqueous electrolyte solution of Comparative Example 1.

Experimental Example 3: Evaluation of Fast Charge Performance

The initial capacity of each of the lithium secondary batteries manufactured in Example 2 and Comparative Example 1 was measured, and then the lithium secondary batteries in the state of charge (SOC) 8% state was charged while changing a C-rate as described in Table 3 below according to an SOC state, and the voltage value was checked with 1 second interval for each charging section to measure the voltage profile.

Thereafter, at room temperature (25° C.), with the termination time set in each section using the C-rate set for each SOC section from SOC 8% to SOC 80%, and the voltage value for each section obtained in a CC mode, termination conditions were set to record the amount of charge when charged in a CC/CV mode. Then, in the CC mode again, discharge was performed with 0.33 C to SOC 8%. Performing charging and discharging as described above was set as 1 cycle, and 70 cycles were performed to measure charge capacity. The fast charge capacity retention rate (%) was evaluated by {Charge capacity measured after 70 cycles/initial charge capacity}×100, and the measurement results are shown in Table 4 below.

TABLE 3

|  | Charging time (sec) | C-rate (C) |
| --- | --- | --- |
| SOC 8%-19% | 92.1 | 4.3 |
| SOC 19%-21% | 17.6 | 4.1 |
| SOC 21%-23% | 18.5 | 3.9 |
| SOC 23%-26% | 28.4 | 3.8 |
| SOC 26%-30% | 40.0 | 3.6 |
| SOC 30%-32% | 21.2 | 3.4 |
| SOC 32%-34% | 22.5 | 3.2 |
| SOC 34%-39% | 60.0 | 3 |
| SOC 39%-44% | 63.2 | 2.85 |
| SOC 44%-50% | 84.7 | 2.55 |
| SOC 50%-57% | 114.5 | 2.2 |
| SOC 57%-63% | 120.0 | 1.8 |
| SOC 63%-70% | 186.7 | 1.35 |
| SOC 70%-80% | 318.6 | 1.13 |

TABLE 4

|  | Fast charge capacity retention rate (%) |
| --- | --- |
| Example 2 | 96% |
| Comparative Example 1 | Not driven |

As described in Table 4 above, in the case of Example 2 in which the non-aqueous electrolyte solution containing all of cyclic carbonate, dimethyl carbonate, and a nitrile-based solvent was used, the capacity retention rate thereof after fast charge was high. However, in the case of Comparative Example 1 in which a nitrile-based solvent was not included, the capacity after fast charge was rapidly deteriorated, so that the battery was not driven.

The invention claimed is:

1. A non-aqueous electrolyte solution, comprising:
an organic solvent including cyclic carbonate, dimethyl carbonate, and a nitrile-based solvent selected from the group consisting of propionitrile, n-butyronitrile, iso-butyronitrile, n-pentenenitrile, 2-methyl-2-butenenitrile, 3-methyl-2-butenenitrile, and a mixture thereof; and
a lithium salt,
wherein the organic solvent comprises the cyclic carbonate in an amount of 5 to 15 vol %, the dimethyl carbonate in an amount of 40 to 90 vol %, and the nitrile-based solvent in an amount of 5 to 40 vol %, based on a total amount of the organic solvent.

2. The non-aqueous electrolyte solution of claim 1, wherein the non-aqueous electrolyte solution further comprises a surfactant.

3. The non-aqueous electrolyte solution of claim 2, wherein the surfactant comprises a compound represented by Formula II:

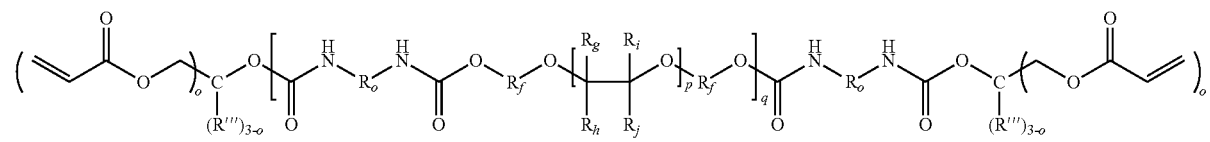

wherein, in Formula II,
$R_f$ is a at least one fluorine-substituted or unsubstituted alkylene group having 1 to 5 carbon atoms,
$R_g$, $R_h$, $R_i$ and $R_j$ are each independently fluorine, or a fluorine-substituted or unsubstituted alkyl group having 1 to 3 carbon atoms,
$R_0$ is an aliphatic hydrocarbon group or an aromatic hydrocarbon group,
R''' is hydrogen, or an alkyl group having 1 to 3 carbon atoms,
is an integer of any one of 1 to 3,
p is an integer of any one of 1 to 10, and
q is an integer of any one of 1 to 15.

4. The non-aqueous electrolyte solution of claim 2, wherein the surfactant is present in 0.01 to 5 wt % based on the total weight of the non-aqueous electrolyte solution.

5. The non-aqueous electrolyte solution of claim 1, wherein the non-aqueous electrolyte solution further comprises at least one additive of a cyclic carbonate-based compound, a halogen-substituted carbonate compound, a sultone-based compound, a sulfate-based compound, a phosphate-based compound, a borate-based compound, a nitrile-based compound, a benzene-based compound, an amine-based compound, a silane-based compound, or a lithium salt-based compound.

6. The non-aqueous electrolyte solution of claim 1, wherein the non-aqueous electrolyte solution further comprises a cyclic carbonate-based compound, a sultone-based compound, a sulfate-based compound, a lithium salt-based compound, and a benzene-based compound.

7. The non-aqueous electrolyte solution of claim 1, wherein a ratio of a volumetric sum of the dimethyl carbonate and the nitrile-based solvent to a volume of the cyclic carbonate is 8 to 10.

8. A lithium secondary battery comprising:
a positive electrode including a positive electrode active material;

a negative electrode including a negative electrode active material;

a separator interposed between the negative electrode and the positive electrode; and the non-aqueous electrolyte solution of claim 1.

9. The lithium secondary battery of claim 8, wherein the positive electrode active material is a lithium composite transition metal oxide represented by Formula A:

$$Li_x[Ni_yCo_zMn_wM^1_v]O_{2-p}A_p \qquad \text{[Formula A]}$$

wherein, in Formula A, $M^1$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, A is one or more elements selected from the group consisting of F, Cl, Br, I, At, and S, and $0.8 \leq x \leq 1.2$, $0.7 \leq y < 1$, $0 < z < 0.3$, $0 < w < 0.3$, $0 \leq v \leq 0.2$, and $0 \leq p \leq 0.2$.

10. The lithium secondary battery of claim 8, wherein the negative electrode active material comprises a carbon-based negative electrode active material and a silicon-based negative electrode active material.

11. The lithium secondary battery of claim 10, wherein the carbon-based negative electrode active material and the silicon-based negative electrode active material are present in a weight ratio of 99:1 to 50:50.

* * * * *